US00RE33923E

United States Patent [19]

Böttger et al.

[11] E Patent Number: Re. 33,923

[45] Reissued Date of Patent: May 12, 1992

[54] STRUCTURAL ELEMENT FORMED OF A RESIN-HARDENED VELOUR FABRIC AND FABRICATION METHOD

[75] Inventors: Wolfgang Böttger, Ködnitz; Kurt Biedermann; Werner Pensel, both of Kulmbach, all of Fed. Rep. of Germany

[73] Assignee: Vorwerk & Co. Interholding GmbH, Wuppertal, Fed. Rep. of Germany

[21] Appl. No.: 419,756

[22] Filed: Oct. 11, 1989

Related U.S. Patent Documents

Reissue of:

[64] Patent No.: 4,840,828
Issued: Jun. 20, 1989
Appl. No.: 219,398
Filed: Jul. 15, 1988

[30] Foreign Application Priority Data

Jul 17, 1987 [DE] Fed. Rep. of Germany ..... 3723681

[51] Int. Cl.[5] ..... B32B 3/06; B32B 5/08; B32B 7/08

[52] U.S. Cl. ..... 428/112; 139/410; 428/113; 428/116; 428/120; 428/196; 428/239; 428/251; 428/252; 428/257; 428/408; 428/902

[58] Field of Search ..... 428/112, 113, 120, 116, 428/101, 257, 224, 196, 239, 251, 252, 408

[56] References Cited

U.S. PATENT DOCUMENTS

| | | | |
|---|---|---|---|
| 3,138,506 | 6/1964 | Ross | 428/116 |
| 3,481,427 | 12/1969 | Dobbs et al. | 181/292 |
| 4,873,133 | 10/1989 | Giles | 428/107 |

FOREIGN PATENT DOCUMENTS

| | | | |
|---|---|---|---|
| 3540455 | 5/1987 | Fed. Rep. of Germany | 428/113 |
| 1393269 | 2/1965 | France . | |

*Primary Examiner*—James C. Cannon
*Attorney, Agent, or Firm*—Watson, Cole, Grindle & Watson

[57] ABSTRACT

A structure based on velour fabric, having at least a first layer and a second layer and intermediate ribs connecting these layers provides a production-efficient, stable and nevertheless light-weight product. The velour fabric is made of a commercial yarn such as aramid fiber, carbon fiber, ceramic fiber or in particular glass fiber. The velour fabric is resin-hardened, wherein the intermediate ribs [for] *form* rigid spacing elements between the first layer and the second layer.

11 Claims, 4 Drawing Sheets

FIG. 8
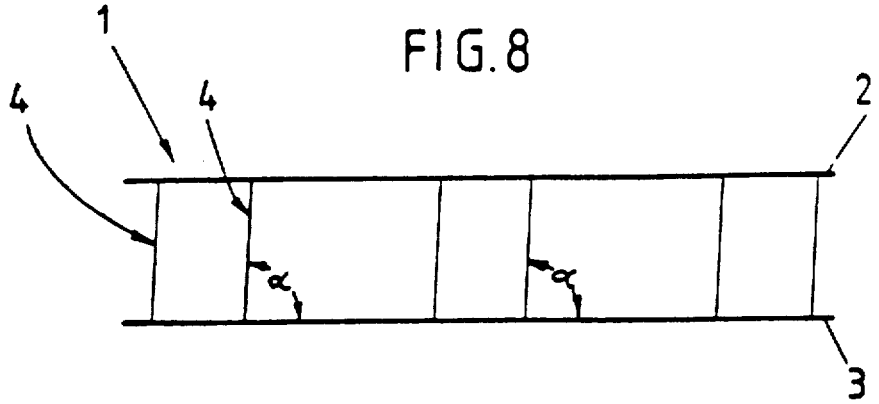
FIG. 9
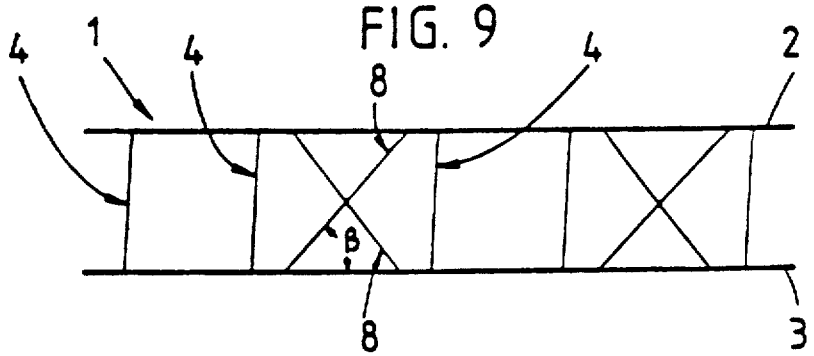
FIG. 11
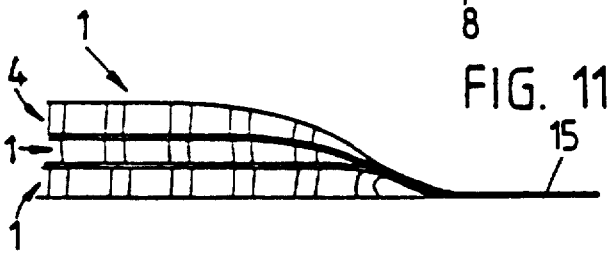
FIG. 10
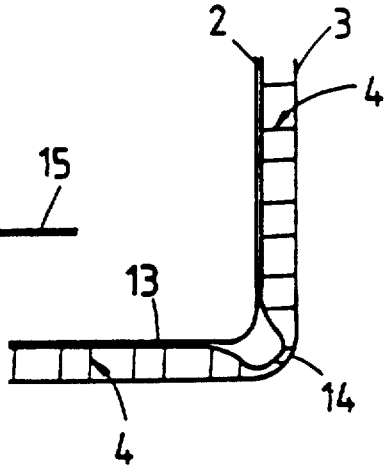
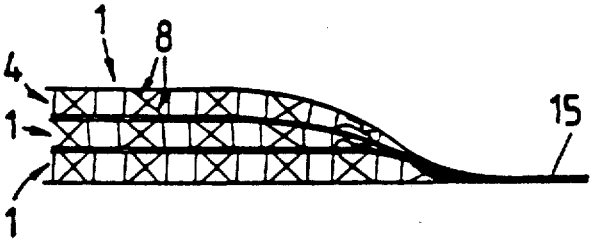
FIG. 12

STRUCTURAL ELEMENT FORMED OF A RESIN-HARDENED VELOUR FABRIC AND FABRICATION METHOD

Matter enclosed in heavy brackets [ ] appears in the original patent but forms no part of this reissue specification; matter printed in italics indicates the additions made by reissue.

The invention relates to structures having first and second layers and intermediate ribs connecting these layers.

Resin-hardened fiber composites have many different uses, e.g., they can be used as supporting construction elements or as sound insulating materials. When used in aeronautical applications, it is necessary for such composites to not only have the greatest possible rigidity and compressive strength, but also to have as little weight as possible.

It is known from U.S. Pat. No. 3,481,427 to make a panel structure using a textile component, in particular a woven fabric made of fiberglass. The panel structure is achieved with a hollow weave process; thus the interconnecting ribs form the walls. All this causes certain problems with resin-hardening; the weave structure sags if special spacing means are not inserted for support. Thus supporting cores are inserted. The latter, however, results in an extremely expensive production.

On the other hand, such types of weaves as weft velvet and warp velvet exist. For an especially economical production process one works with two layers at once; the result being a so-called double velvet in which the connecting ribs between the layer-providing velour threads form a double compartment. The length of the floating threads is adjustable so that larger or smaller rib lengths can be achieved. The center cut of the pile thread is done on the cutting bench.

With the knowledge of this velour weave process or Raschel plush weave process, the object of the present invention is to provide with simple production techniques and even using available machinery a simple, yet stable, multi-layered structure which is built up almost like a sandwich and which optimally embodies the aforementioned properties.

According to the invention the object is achieved with a structural element which comprises a velour fabric in the form of two generally parallel layers that are separated by intermediate ribs formed of free-standing threads, this velour fabric being made of aramid fibers, carbon fibers, ceramic fibers, or (preferably) glass fibers, and a hardened resin impregnated within the layers and intermediate ribs of the velour fabric.

As a result of such a construction, a structural component having high flexural and compressive strength is obtained, which also yields good results with respect to the weight factor. The distance between the layers is not bridged by woven sections, but rather by free floating threads, which provide the support for the layers. These threads can be formed of aramid fibers, carbon fibers, ceramic fibers or, preferably, glass fibers, or a mixture of these fibers. Dependent on the weave structure combined with the properties of such materials, the rib-forming support threads have the tendency to stand up. Thus they prop up the two layers such that there is a space. The result is a structure that can be obtained in the weaving process and that tolerates the undamaged diversion into the enmeshing regions. The resetting force, which is even similar to stored energy, alleviates even the need for external support during fabrication; rather it has been found that the velour fabric with hardened resinification provides with many uniformly distributed, individual, free-standing intermediate ribs such stable spacing elements that even the maximum load to be expected from its usage can be absorbed. Due to the high percentage of cavities the result is also a high degree of sound isolating and absorption. Correspondingly a lot of material is saved, which is of great interest today. Even though the structure is flexible, it has relatively good formability. In this regard, a slight spherical curvature of the sandwich-like body is easily achieved. Further structural measures have also proven to be advantageous in practice to the extent that the medium-sized length of the intermediate ribs is larger than the distance between the layers. In this manner the intermediate ribs obtain a more or less acutely sloped position, whereby in certain embodiments it has proven to be advantageous that the intermediate ribs extend at an angle to the layers. In this manner a load flowing in over the width-wise surface is converted still into a unidirected shifting component of layers. This is especially advantageous in partial high loads, since then the entire body is included in the resistance to deformation. The corresponding adjustment, i.e., the unidirection of the ribs, makes the deformation movement determinable. It has been proven to be advantageous that the intermediate ribs form an angle of about 65° with a horizontal plane. Depending on the desired application of the inventive structure, greater angularity can be beneficial. In this case the intermediate ribs can form an angle of about 85° with a horizontal plan, thus having almost a vertical direction to the horizontal plane.

Another means for optimizing the flexibility with nevertheless high staying power consists of utilizing an intermediate rib comprising two slightly twisted single ribs. This effectively provides springs which are almost in the form of a helix but due to the only slight twisting can, nevertheless, be axially heavily loaded. Only when overloaded does deformation occur due to further bending. In order to further heighten this effect, it is also proposed that the intermediate ribs comprise single ribs twisted in the shape of an eight.

Even greater distances between the layers can be advantageously bridged without loss of stability by connecting the individual ribs at the crossing-over region. Here, too, there is no weaving-wise connection, but rather such a connection is achieved by using binding resins. In this manner the entire length of the spacing elements is divided into two springing zones, each having the same effect and adjoined to one another in the direction of support, whereby in this respect it has also been proven to be advantageous that in the outlet area of the layers the intermediate ribs have prop-like transition regions. The zones, which can be compared to a tree stump spreading out towards the ground, resist any notching impact. Rather the rotationally symmetrical, thus annular, transition corner is filled out in a rib-supporting manner. Another advantageous variation of the rib structure consists of the intermediate ribs being alternatingly spaced at large and small intervals. In another variation it is proposed that the intermediate ribs that cross one another be interconnected. Another advantageous process for production of the described component by resinification and subsequent hardening of a fabric, whereby following the resinification of the fabric the resin is partially removed through applying pressure, consists of the fact that in using a velour fabric, which is made of a commercial yarn such as aramide fiber, carbon fiber, ceramic fiber, or in particular a glass fiber, the resin is removed to such an extent that the resetting force of the intermediate ribs is liberated. If the pressure forces are omitted, the resin-coated spacing elements spontaneously move back into their starting position. After hardening, the entire structure is solidified. In addition to this, it is proposed that the weft threads be beat up in the conventional manner by means of a serrated blade. The result of this is not only almost complete vertical positioning of the intermediate ribs between the layers but also primarily an exact parallel spacing of the layers of the fabric. In those cases in which the component is to comprise several section of fabric, the process is carried out in such a manner that a velour section of fabric is slit in the connecting region and the other velour section of fabric is inserted into the opening thus provided. If the intention or the requirement is to achieve a smooth plane even in the connecting regions, the space between the layers, which exists in any case, can be used by pressing in the overlapping layer, whose wall is moved by the width of one layer. Consequently the space has also another advantageous function. Also with respect to the connecting process itself it has been proven to be advantageous that the overlapping layer sections mate like brush-like bodies with the joints of the loops of the fabric of the underlying wall sections due to the projecting ends of the intermediate ribs. Thus the layers are, so to speak, "locked." On the other hand, the spring rod-like ribs which are correspondingly axially compressed, deform in the lateral direction without breaking. The effect of the resin assuring this connecting is to work towards the tendency to reset into the original length so that the connecting region between the two sections of fabric is hardly perceptible with the eye.

The invention will be better understood by means of the attached drawings, which illustrate various embodiments of the invention.

BRIEF DESCRIPTION OF THE DRAWINGS

FIG. 8 is a schematic side view similar to FIG. 3 of a structural element according to a third embodiment of the present invention, FIG. 9 is a schematic side view similar to FIG. 3 of a structural element according to a fourth embodiment of the present invention, FIG. 10 is a schematic view of a corner configuration of the structral element of FIG. 8 when bent, FIG. 11 is a schematic side view of three structural elements according to FIG. 8 which are stacked together and connected at their flattened edges, and FIG. 12 is a schematic side view of three structural elements according to FIG. 9 which are stacked together and connected at their flattened edges.

DETAILED DESCRIPTION OF THE PREFERRED EMBODIMENTS

Figures 1, 2:
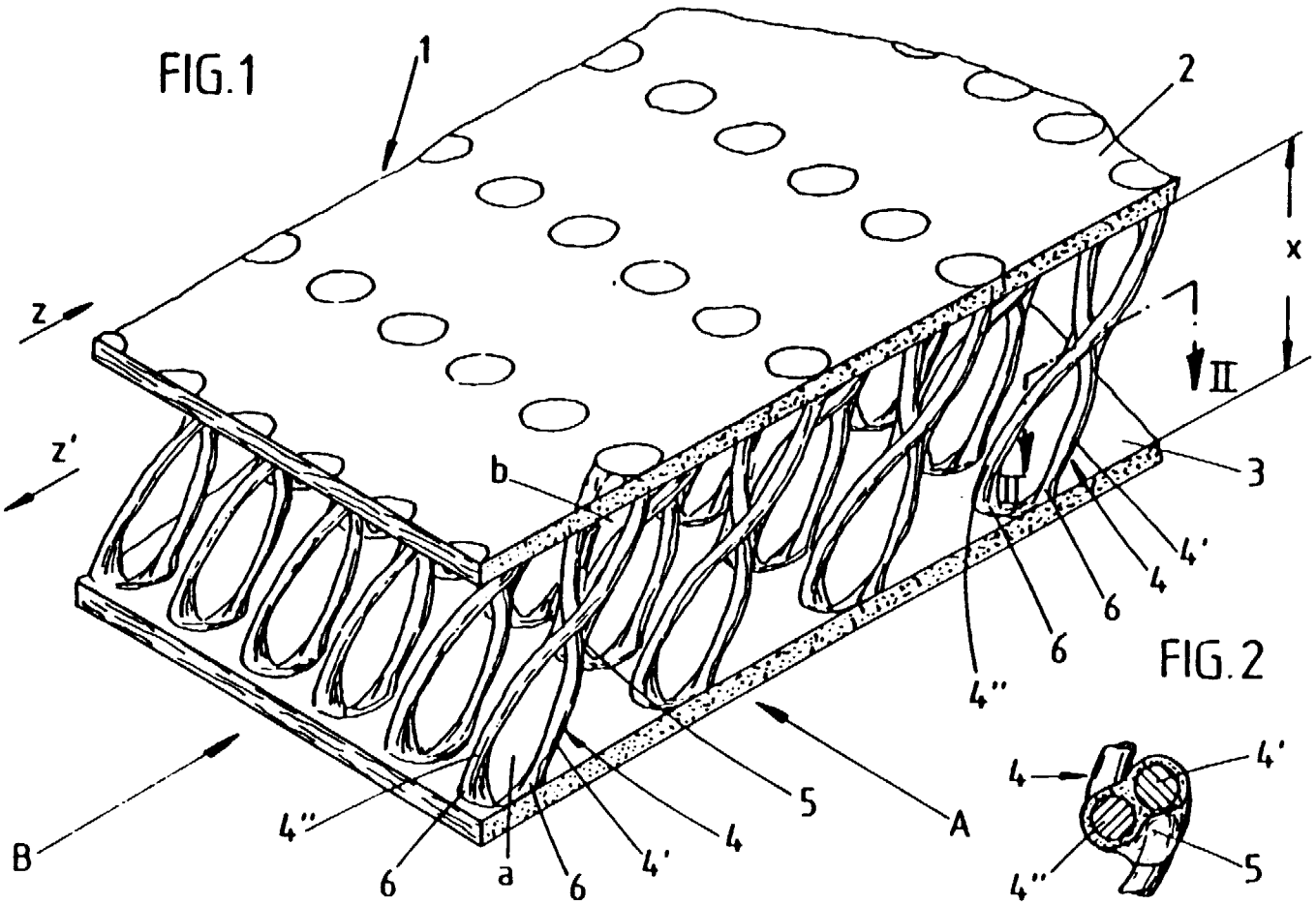
FIG. 1 is an enlarged perspective view of a portion of a structural element according to a first embodiment of the present invention.
FIG. 2 is a cross-sectional view along the line II—II of FIG. 1.

The illustrated structure 1 is produced on a velour weaving machine. The corresponding velour fabric or Raschel plush fabric is multi-layered; in the embodiment, it has two layers. The first, uppermost layer is designated by the reference number 2; a second, bottom layer is designated with 3. Interwoven supporting threads, which form the intermediate ribs 4, form the connection and spacing between the two layers 2,3. The figure shows the unslit structure of a mating of double velvet.

The number of supporting threads result from the weft density of layers 2 and 3, furthermore the number of supporting threads, measured over the cloth width, and finally from the number of weaving repeats. For example, 2,000 threads per 1 m of cloth width, 12 weft per cm in the upper layer and the bottom layer, and 3/6 weft weave yield 800,000 intermediate ribs 4 between the two layers 2,3.

By modifying the number of rib threads, weft density and weave, multifold more or also fewer intermediate ribs 4 can be woven in. The required strength of the upper layer 2 and the bottom layer 3 and flexural strength are achieved by the corresponding material use of warp and weft in the cover layers. Of course, the height of the rib can be varied and each rib can be individually adjusted to the desired height.

Commercial yarns such as aramid fibers, carbon fibers, ceramic fibers or, in particular, glass fibers are utilized.

Due to the resetting force intrinsic in such high performance fibres and also dependent on the connecting structure, the supporting threads forming the intermediate ribs 4 have the tendency to right themselves after the weaving or to reset themselves to their load-free state. This results on the parallel spacing between layers 2 and 3. The slight distance x between the two layers 2 and 3 corresponds to the multiple of one layer thickness.

Like the entire component article, the intermediate ribs 4, which are comparable to the pile threads of a velour velvet weave, are stiffened by hardening resin so that the intermediate ribs 4 between the first layer 2 and the second layer 3 form rigid spacing elements. The intermediate ribs 4 automatically reset into their end position, as is evident from FIG. 1, after the weave structure has been completely compressed. Even during the weaving process no damage occurs due to the mandatory diversions. This fact can be advantageously used in the production of such components.

As is evident from the figures, the medium-sized length of the intermediate ribs 4 is greater than the clear distance x between the layers 2,3. Thus the free sections of supporting threads which form the layer do not change on the shortest path between the two neighboring layers 2,3. Rather as FIG. 1 shows, the result is a slight slanting position, as seen from the A line of sight in FIG. 1. This is even more evident from the schematic illustration of FIG. 3, for example. With respect to all intermediate ribs 4, a unidirectional slope is applied so that the discussion can be about an adjusting tilting.

Figure 3:
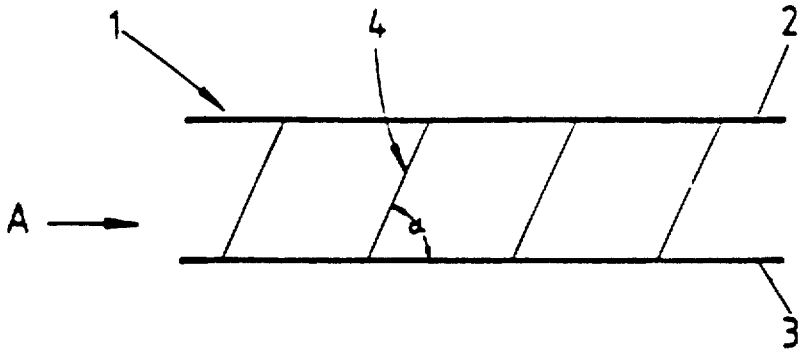
FIG. 3 is a schematic side view of the structural element as seen in direction A in FIG. 1.

With respect to this, according to FIG. 3, the slope angle is about 65° with respect to the horizontal bearing base of the component 1 forming a horizontal plane.

Figure 6:
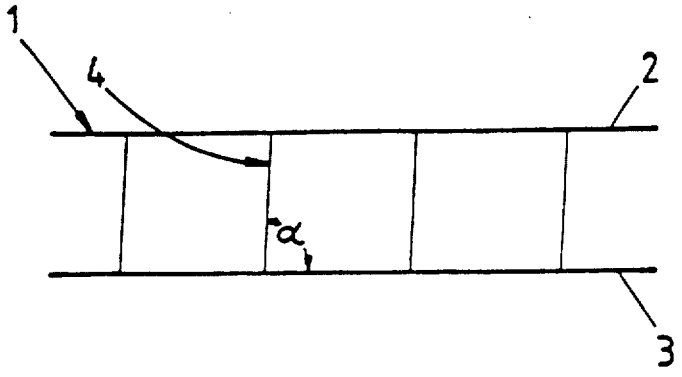
FIG. 6 is a schematic side view similar to FIG. 3 of a structural element according to a second embodiment of the present invention.

According to the variation of FIG. 6, all intermediate ribs form a slope angle of about 85° with said horizontal plane, thus providing a very steep slope.

The variation of FIG. 8 embodies a solution to the extent that the intermediate ribs 4 are spaced alternately at large and small intervals. The large interval corresponds to about twice the smaller interval of the parallel intermediate ribs. In FIG. 8 these intermediate ribs are configured at an angularity to the horizontal plane as in FIG. 6.

The same is applicable to the variation of FIG. 9, however, with the difference that intermediate ribs 8 are provided such that they are inserted cross-wise between the two intermediate ribs 4. These intermediate ribs 8 are in the larger space between two intermediate ribs 4. The crossing-over angle is at 50° to the horizontal plane. The pile threads of the fabric, forming the intermediate ribs 8, have a root gap with respect to the neighboring row of intermediate ribs which corresponds to about one-fifth of the length of a intermediate rib 8.

Figure 4:
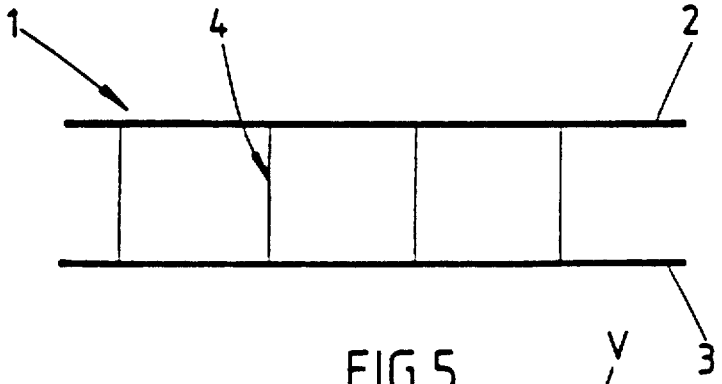
FIG. 4 is a schematic side view of the structural element as seen in direction B in FIG. 1.

On the other hand, the line of sight 8 in FIG. 1 yields in all cases a vertical direction (compare FIG. 4) to the base.

The term "medium-sized length" is selected because each of the intermediate ribs 4 comprises a slightly twisted angle rib 4', 4'', the actual length is larger. The slightly helical increase is the result of the perspective illustration, FIG. 1. Seen in the direction of the arrow B, a single rib alternates from back to front in the direction of slope and in particular with respect to the outlet region on the side of the layer.

Thus the intermediate rib 4 is twisted into an eight (comparable with an oval ring twisted 180° around a longitudinal axis), whereby the individual ribs 4, 4'' in their crossing-over region 5 are connected to one another. Such junction-like crossing-over regions 5 are achieved by ribbon sections of the intermediate ribs 4, which form the eight and make contact when they overlap one another.

In the outlet region on the side of the layer and correspondingly, of course, also in the inlet region, the intermediate ribs 4,8 exhibit prop-like transition regions 6, somewhat comparable to above ground root extension of trees, etc. The tree stump base corresponds to the multiple of the cross-section of a single rib 4' or 4''. The spherical fields, which can be recognized at the top of FIG. 1, are to symbolize the layer inlet region of the intermediate ribs 4. Its basis is a W-shaped mating.

After weaving in the crossing over region 5, the intermediate rib 4, configured as an eight, provides two drop-like or chain link-like sections, whose cavity is designated with a, b and which can, however, also be filled in completely or partially with resin, depending on the neighboring position of the individual ribs 4', 4''.

Thus or also in the free state of the individual ribs 4', 4'', the result is always a spacer, which is quite rigid, similar to a column or rod and, neverthless has also a specific flexibility in the axial direction.

Partial loadings in the width-wise surfaces of component 1 also result in the participation of the intermediate ribs in the further environment, since due to the slight, sloping position, which in addition to this is also unidirected, a counter-opposing displacement movement of the layers 2 and 3 occurs (arrows z,z' in FIG. 1). In addition to thus good distribution of load, the described configuration of the intermediarte ribs 4 also works towards attenuating the forces.

Figure 7:
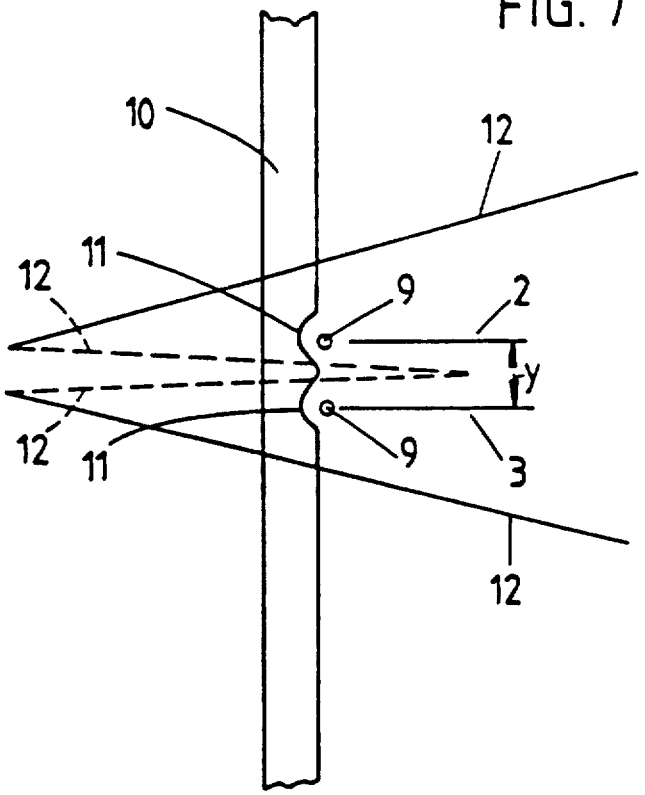
FIG. 7 is a schematic illustration of the insertion of a serrated blade.

A constant parallelism of layers 2 and 3 is obtained by beating up the weft thread 9 of the upper and bottom fabric layer by means of a serrated blade 10 (cf. FIG. 7). The reed dents of the serrated blade 10 have notches 11 on the cloth side, whose base defines the center distance y of the layers 2 and 3, say upper and bottom cloth. The distance can be, for example, 8 mm. Over said distance the serrated blade permits the weft threads 9 to stop at the exact height. The warp threads are designated throughout with 12 and form the intermediate ribs 4,8.

The non-uniform distribution of intermediate ribs results in relatively large interstitial spaces. This reduces the absorption of resin. The parts have a lighter weight. The X-shaped blocking of the spaces also increases the strength.

The application examples, according to FIGS. 10 to 12, show with the aid of the embodiment FIG. 10 a corner configuration in which the upper layer 2 folds into the inner corner of the angular component. This constellation can be blocked by an additional layer 13 put on the inside. The additional layer 13 runs essentially parallel to the crown zone 14 of the profile.

FIGS. 11 and 12 show the structure laminates. They are connected by means of their edges. The edge zone 15 is reduced to a minimum of the total thickness. This occurs by means of bundling the layers 2,3 of each structure 1. Advantageous is still the opposing angular position of the individual components 1. This results in an internal locking and a very high rigidity of the total component.

The explained fabric structure is saturated with commercially available resin plus hardener. The excess quantity of resin is squeezed or rolled out so that the internal structure is resin-free, except for the wetted supporting threads, which form the ribs, and the two saturated layers of fabric. The inlet regions, which are dislocated from time to time, of the individual ribs 4',4'' result in a sliding movement along the lateral sections up to the maximal resetting zone. During this procedure in which the resin is scrapped off, sufficient resin is carried along that the crossing-over regions 5 are well saturated with resin; refer to FIG. 2 which shows such a resin collection zone. The corresponding evacuation of resin occurs to such a degree that the resetting force of the intermediate ribs 4 is liberated until said ribs, as stated above, reach their base or end position. After the drying process, the result is hardened structures which high rigidity and compressive strength. The good deformability of the velour fabric or Raschel plush fabric also permits the production of slightly spherically bent components.

Furthermore, structures with varying strengths can be made from a fabric by local and varying compression of the saturated fabric.

As a result of a single interconnected structure, the actualized sandwich-like construction acts against any tendency to delaminate, for example in the sense of a layer peeling off.

Figure 5:
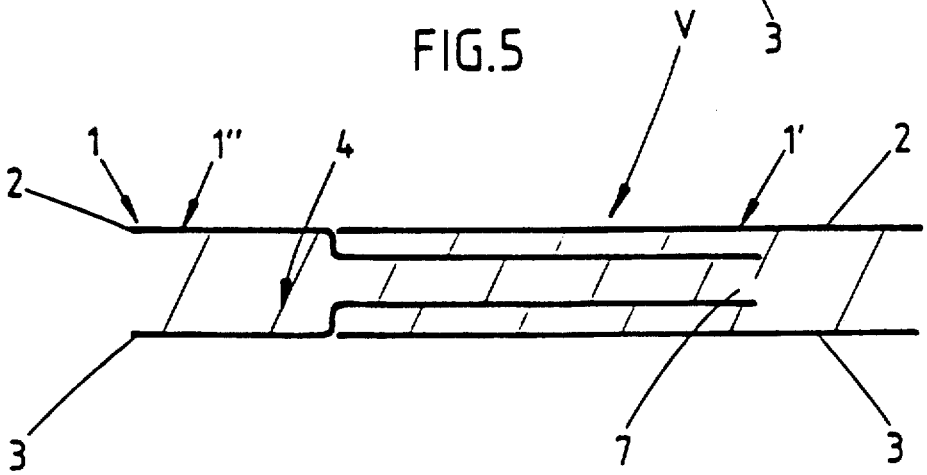
FIG. 5 is a schematic side view of a connecting zone between two velour fabric sections of the inventive structure.

In the case of larger structures which exceed the cloth width, such a structure 1 comprises several sections of fabric 1',1''. To achieve this, the one section of velour fabric 1' is slit in the connecting region to the other section 1'' of velour fabric. This measure to be taken is evident from the schematic illustration in FIG. 5. The slit is designated there with 7 and is produced by a center cut corresponding to the desired depth of overlapping. The corresponding edge zone of the adjoining fabric section 1'' is inserted into the opening thus provided. While retaining a constant total thickness of the component 1, the edge layers next to the connecting regions are compressed in the direction of the interstitial spaces. Then the described saturation by means of resin and squeezing out follows. The fabric resets itself in the explained manner. The corresponding resetting can be restricted by means of rear support in the connecting region V so that the component 1 has uniform thickness. The severely flattened out edge zone vanishes in the existing interstitial space. The brush-like rib stubs which are free standing due to slitting bury themselves anchored in the exterior of the overlapped edge of the fabric section 1''. The latter results in an internally stable connection.

We claim:

1. [Structural] *A rigid structural* element comprising a velour fabric formed of two generally parallel layers and intermediate ribs connected between and separating said layers, said intermediate ribs being formed of threads, said velour fabric being made of aramid fibers, carbon fibers, ceramic fibers or glass fibers, and a hardened resin impregnated within said velour fabric.

2. [Structural] *A rigid structural* element according to claim 1, wherein the medium-sized length of said threads is greater than the distance (x) between said layers.

3. [Structural] *A rigid structural* element according to claim 1, wherein said threads extend between said layers at an angle other than 90°.

4. [Structural] *A rigid structural* element according to claim 3, wherein the intermediate threads extend at an angle (alpha) of about 65° with respect to said layers.

5. [Structural] *A rigid structural* element according to claim 3, wherein the intermediate threads extend at an angle (alpha) of about 85° with respect to said layers.

6. [Structural] *A rigid structural* element according to claim 1, wherein said intermediate ribs comprise two slightly twisted single threads.

7. [Structural] *A rigid structural* element according to claim 6, wherein said intermediate ribs comprise individual ribs twisted in the shape of an 8.

8. [Structural] *A rigid structural* element according to claim 6, wherein said intermediate ribs are formed of threads which are connected to one another at a crossing-over region.

9. [Structural] *A rigid structural* element according to claim 1, wherein the intermediate ribs have prop-like transition regions in the outlet region of the layers.

10. [Structural] *A rigid structural* element according to claim 1, wherein the intermediate ribs are arranged alternately at larger and smaller intervals.

11. [Structural] *A rigid structural* element according to claim 1, including intermediate ribs formed of crossed threads.

* * * * *